United States Patent
Li et al.

(10) Patent No.: US 9,178,404 B2
(45) Date of Patent: Nov. 3, 2015

(54) LIQUID-COOLED SELF-EXCITED EDDY CURRENT RETARDER WITH A STRUCTURE OF TWO SALIENT POLES

(71) Applicant: Beijing University of Technology, Beijing (CN)

(72) Inventors: Desheng Li, Beijing (CN); Xiao Du, Beijing (CN); Kai Zhang, Beijing (CN); Bingfeng Jiao, Beijing (CN)

(73) Assignee: Beijing University of Technology, Beijing (CN)

( * ) Notice: Subject to any disclaimer, the term of this patent is extended or adjusted under 35 U.S.C. 154(b) by 436 days.

(21) Appl. No.: 13/670,601

(22) Filed: Nov. 7, 2012

(65) Prior Publication Data

US 2013/0234542 A1 Sep. 12, 2013

(30) Foreign Application Priority Data

Mar. 9, 2012 (CN) .......................... 2012 1 0061808

(51) Int. Cl.
| | |
|---|---|
| *H02K 9/19* | (2006.01) |
| *H02K 21/12* | (2006.01) |
| *H02K 49/04* | (2006.01) |
| *H02K 1/20* | (2006.01) |
| *H02K 7/20* | (2006.01) |

(52) U.S. Cl.
CPC ................ *H02K 21/12* (2013.01); *H02K 1/20* (2013.01); *H02K 7/20* (2013.01); *H02K 49/043* (2013.01); *H02K 9/19* (2013.01)

(58) Field of Classification Search
CPC ......... H02K 9/19; H02K 9/193; H02K 21/12; H02K 21/125; H02K 21/18; H02K 21/185
USPC ............. 310/54, 105–108, 103, 92, 266, 112, 310/114
See application file for complete search history.

(56) References Cited

U.S. PATENT DOCUMENTS

| | | | | |
|---|---|---|---|---|
| 4,654,551 | A | * | 3/1987 | Farr ............................... 310/112 |
| 4,739,204 | A | * | 4/1988 | Kitamura et al. ............... 310/54 |
| 6,177,746 | B1 | * | 1/2001 | Tupper et al. .................. 310/114 |
| 2005/0110365 | A1 | * | 5/2005 | Shkondin ....................... 310/266 |
| 2013/0015026 | A1 | * | 1/2013 | Li et al. .......................... 188/267 |

* cited by examiner

*Primary Examiner* — Michael Andrews
(74) *Attorney, Agent, or Firm* — Han IP Corporation

(57) ABSTRACT

A liquid-cooled self-excited eddy current retarder having two salient poles is provided. The liquid-cooled self-excited eddy current retarder may comprise a retarder rotor, a retarder stator, a retarder coil, a retarder generator and a control module. The retarder rotor may be a jagged turntable, and an axial cross section of the jagged turntable may be in an inverted h shape. Each of the two salient poles may be located at a respective one of two axial ends of the jagged turntable. The retarder rotor may be connectable to a transmission shaft, and an inner circle of the retarder stator may be coaxial with an outer circle of the retarder rotor. The retarder coil may be an independent coil and disposed between the two salient poles of the retarder rotor. The retarder coil may be affixed to the retarder stator.

4 Claims, 2 Drawing Sheets

LIQUID-COOLED SELF-EXCITED EDDY CURRENT RETARDER WITH A STRUCTURE OF TWO SALIENT POLES

CROSS-REFERENCE TO RELATED APPLICATION

This application claims the priority benefit of Chinese Patent Application No. 201210061808.1, filed on Mar. 9, 2012, which is hereby incorporated by reference in its entirety.

TECHNICAL FIELD

The present invention relates to an eddy current retarder for assisting in the braking of a vehicle by producing an eddy current braking moment through a metal plane or a metal cambered surface. In particular, the present invention relates to an automobile retarder with a structure of two salient poles utilizing circulated liquid for cooling, which belongs to the field of the automobile brake.

BACKGROUND

A fundamental principle of an eddy current retarder, being used as an automobile auxiliary braking device, is as follows: When a metal plane or a metal cambered surface is moving, eddy current is generated by induction inside the plane or surface and accordingly a braking torque is generated. The kinetic energy of the automobile is converted into thermal energy to be consumed through a medium, such as a magnetic field, and thus a retarding force can be realized. A prominent characteristic of the eddy current retarder is the non-contact brake. By improving the brake performance of the automobile, rapid loss of a brake block and a tire caused by friction in the traditional way of braking can be avoided. Moreover, the braking noise can be eliminated; the environmental pollution can be avoided; safety, comfort and economic efficiency in driving the car can be greatly improved; the fatigue of a driver can be alleviated; the working efficiency can be improved; the slamming on the brake can be reduced; and the car is smoother to drive. In addition to the advantages of the eddy current retarder the self-excited eddy current retarder is also capable of self-generating such that additional or enlarged power generator and storage battery of the automobile are unnecessary. Further, the issue of matching a retarder excitation power supply and a car-mounted power supply is eliminated.

Existing self-excited retarders generally consist of a stator with a plurality of groups of excitation coils, a rotor with air duct and a power generation system. The rotor is arranged on a transmission shaft of the automobile, and the coils of the stator are fixed on a car frame. A power generator is a three-phase power generator and supplies direct-current (DC) excitation after being rectified by a rectifier to the stator. When the power generation system is not in operation, no current flows through the coils of the stator, and the self-excited retarder stays at a non-braking state. When the power generation system is started to supply power to the retarder, the coils of the stator are electrified, and an inner plane of a housing rotates to cut magnetic induction lines, i.e., an eddy current is generated on the inner plane, so that a braking moment is generated. Accordingly, generated heat accumulates on the rotor and is dissipated into air through a heat dissipation fin on the rotor. The air-cooling way of heat dissipation has relatively low heat dissipation efficiency, is incapable of dissipating the heat quickly and effectively into the air, and is likely to cause thermal decay. Furthermore, existing retarders tend to have relatively complex structure due to multiple groups of coils. To ensure a constant clearance between the rotor and the stator, high precision in assembling the retarder is required, and the assembling is relatively troublesome. Moreover, control is relatively complicated as there are many wires extending from the coils.

SUMMARY

The present invention aims at providing a novel retarder structure to overcome deficiencies in the existing retarder structure. By utilizing a self-generating and single-coil design with liquid-based heat dissipation, the novel retarder structure has advantages of simplicity and easiness in assembling, simple structure, easiness in control, long service life, low retarder temperature, small heat fade, uneasiness in burning of coils, electricity conservation, and inability to cause huge impact on automobile batteries while starting and the like.

An embodiment of the present invention is realized through a scheme as described below.

One embodiment of the present invention comprises a retarder rotor (9), a retarder stator (5), a retarder coil (8), a retarder generator and a control module. The liquid-cooled self-excited eddy current retarder with the structure of two salient poles is described below. The retarder rotor (9) is a jagged turntable, as shown in FIG. 2. An axial cross section of the jagged turntable is in an inverted h shape. Two projections at two sides of the jagged turntable form two salient poles of the retarder rotor (9). The retarder rotor (9) is connected to a transmission shaft (13), and an inner circle of the retarder stator (5) is coaxial with an outer circle of the retarder rotor (9). The retarder coil (8) is an independent coil and installed between the two salient poles of the retarder rotor (9). The retarder coil (8) is affixed to the retarder stator (5).

The retarder generator comprises generator permanent magnetic poles (10), a generator armature core (11), and a generator armature winding (12). Multiple pairs of generator permanent magnetic poles (10) are uniformly distributed on the inner wall of the retarder rotor (9) and are respectively rotary parts. The generator armature winding (12) and the generator armature core (11) are installed on a retarder holder (4) and are respectively fixed parts. The generator armature winding (12) and the retarder coil (8) are respectively connected through a rectification module.

Output current of the generator armature winding (12) is connected to the rectification module (1). A controller (2) receives a sinusoidal signal of one phase of three-phase current of the retarder generator through the rectification module (1), and a speed signal of the retarder is obtained. One output of the rectification module (1) is connected to the retarder coil (8) through the switch device (3) and is used for supplying power to the retarder coil (8). One output of the controller (2) is connected to a control end of the switch device (3) and is used for adjusting the current flowing through the retarder coil (8).

A clearance of 0.5 mm to 1 mm between the outer circle of each salient pole of the retarder rotor (9) and the inner wall of the retarder stator (5) is maintained.

The retarder stator (5) is provided with a coolant channel (6) for cooling. The coolant channel (6) is connected with an automobile water tank through a water pipe, and liquid coolant inside the coolant channel (6) is circulated with cooling liquid inside the automobile water tank or with an independent cooling device of the retarder.

The generator permanent magnetic poles (10) comprise multiple pairs of permanent magnets which are uniformly distributed on the inner wall of the retarder rotor (9) along the circumferential direction.

When the liquid-cooled self-excited eddy current retarder with a structure of two salient poles is in operation, the rotating shaft 13 drives the retarder rotor 9 and the generator permanent magnetic poles 10, which are installed on the inner wall of the retarder rotor 9 to rotate so that an electromotive force is generated by the generator at the moment and supplies power to the retarder coil 8. Additionally, a current is generated in the retarder coil 8. A magnetic field is generated after the retarder coil 8 is electrified, and as the retarder coil 8 is installed between the two salient poles of the retarder rotor 9, a toroidal magnetic circuit shown in FIG. 1 is formed. The retarder rotor 9 of the liquid-cooled self-excited eddy current retarder with a structure of two salient poles is in a jagged structure. Magnetic lines in the retarder rotor 9 are divided to pass through each tooth to reach the inner wall of the retarder stator 5 via air gaps. The magnetic lines in each tooth of one salient pole are in the same direction, as shown in FIG. 2. The magnetic lines in the air gap are vertical to the outer circle plane of the retarder rotor 9 and the inner circle plane of the retarder stator 5. When the rotating shaft 13 drives the retarder rotor 9 to rotate, the retarder stator 5 cuts the magnetic lines transmitted by the salient poles of the retarder rotor 9 and the eddy current is generated on the inner surface of the retarder stator 5, so that the braking moment is generated. The braking moment acts on the automobile transmission shaft through the retarder rotor 9, so that a retarding brake effect on the automobile can be achieved. A sinusoidal signal collected from the generator armature winding 12 is converted by the controller into a square wave signal so as to obtain speed data. The current in the retarder coil 8 is adjusted by controlling the switch device 3, so that the retarder can be continuously adjusted. Heat produced on the retarder stator 5 is transferred away by the liquid inside the coolant channel 6, and the liquid coolant inside the coolant channel 6 is circulated with the cooling water of the generator or with the independent cooling device of the retarder and then returns to the retarder to be circulated. When no brake is required, the control module stops supplying power to the retarder coil 8, so that no magnetic field is generated in the retarder coil 8. Accordingly, no eddy current is generated in the retarder stator 5, and no braking moment is generated.

The liquid-cooled eddy current retarder with a structure of two salient poles has a number of main advantages as described below.

The liquid-cooled eddy current retarder is self-generating, so that the electric energy can be saved. The huge impact on the automobile batteries can be avoided when the retarder is started at the very beginning. The independent coil which is centrally wound is sleeved in the middle of a rotor disc. Accordingly, the winding, installation and controlling procedures of the coil are simplified, and the coil is easy to be assembled. The coil is affixed on the inner circle plane of the stator, so that a brushless structure for a stationary coil is realized. Compared with traditional eddy current retarders, the stator is a shell, so that safety and reliability are achieved. The stator is provided with a cooling liquid pipeline, and the heat is dissipated by circulation, so that ideal heat dissipation effect is achieved. The decay of the long-term braking moment is small, and the retarder has a compact general structure and small size and mass.

Figure 1:
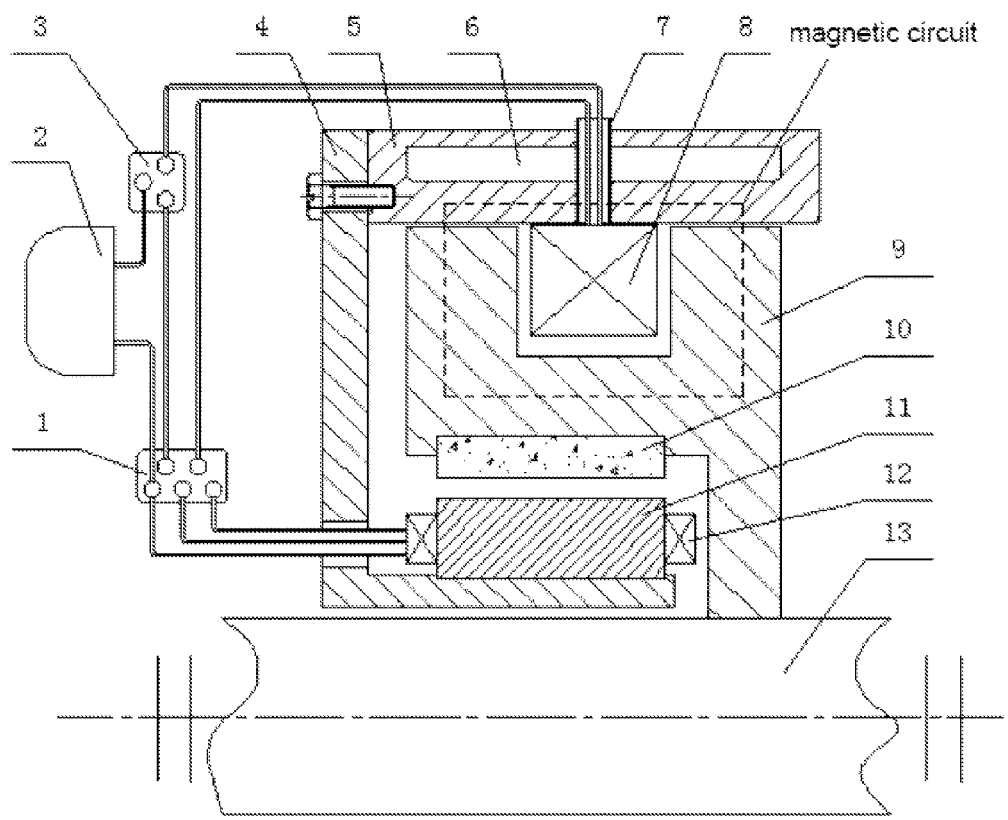
FIG. 1 illustrates a structural front view of a retarder in accordance with an embodiment of the present invention.

Numeration of various components illustrated in FIG. 1 is as follows: 1. rectifier module; 2. controller; 3. switch device; 4. retarder holder; 5. retarder stator; 6. coolant channel; 7. conducting wire jacket; 8. retarder coil; 9. retarder rotor; 10. generator permanent magnetic poles; 11. generator armature core; 12. generator armature winding; 13. rotating shaft.

DETAILED DESCRIPTION OF SAMPLE EMBODIMENTS

A sample embodiment of the invention is further stated as follows with reference to the attached illustrations.

Figure 2:
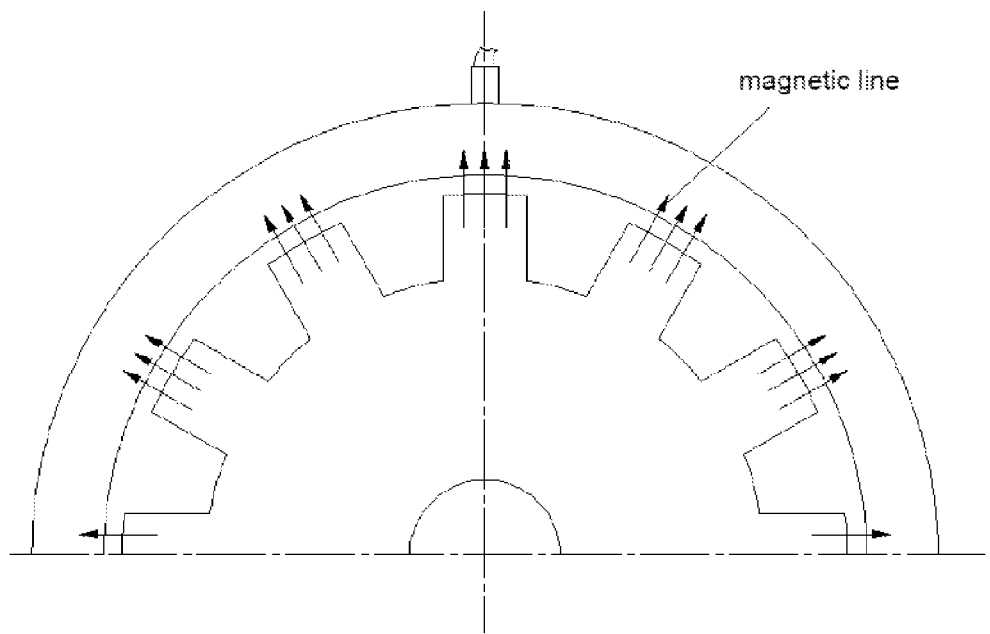
FIG. 2 illustrates a structural side view of the retarder in accordance with an embodiment of the present invention.

As shown in FIG. 1 and FIG. 2, the retarder rotor 9 of the sample embodiment is connected with the rotating shaft 13 through a spline. The retarder rotor 9 is of the jagged structure as shown in FIG. 2. The axial cross section of the jagged turntable is in an inverted h shape. Two salient poles of the retarder rotor 9 is located at two axial ends of the jagged turntable, one salient pole at a respective axial end. The retarder coil 8 is centrally wound, and is disposed between the two salient poles of the retarder rotor 9 and is affixed on the inner wall of the retarder stator 5. The retarder stator 5 is installed on a body frame of an automobile. A liquid coolant inside an external coolant channel 6 of the retarder stator 5 is circulated with a cooling liquid, e.g., water, of the generator or with an independent cooling device of the retarder. Multiple pairs of generator permanent magnetic poles 10 are installed on the inner wall of the retarder rotor 9, and the rotating shaft 13 can drive the retarder rotor 9 and the generator permanent magnetic poles 10 to rotate. The retarder generator is located inside the retarder, and the generator armature winding 12 and the generator armature core 11 are installed on the retarder holder 4. The generator armature winding 12 is connected with the retarder coil 8 through the rectification module 1 and the switch device 3. One end of the controller 2 is connected to the input end of the rectification module 1, and the other end of the controller 2 is connected to the control end of the switch device 3.

When the retarder is in operation, a sinusoidal signal collected from the generator armature winding 12 is converted by the controller 2 into a square-wave signal to obtain speed data. The controller 2 controls the switching on and off of the switch device 3 according to the speed data and a gear signal, so that the generator armature winding 12 inside the retarder is coupled to the retarder coil 8, resulting in the retarder coil 8 being excited. The magnetic lines are generated inside the retarder rotor 9 at the moment. The retarder stator 5 cuts the magnetic lines transmitted by the salient poles of the retarder rotor 9 so as to generate an eddy current inside the retarder stator 5 and to produce a resisting moment that obstructs the rotation of the retarder rotor 9. The resisting moment is transferred onto the automobile rotating shaft 13 through the spline on the retarder rotor 9, thereby achieving retarding brake effect on the automobile. While braking, as the eddy current acting on the stator water jacket produces heat. The heat is transferred away by the liquid coolant inside the coolant channel 6, and the liquid coolant returns to the retarder to be circulated after being cooled by a heat radiator of the generator water tank of the automobile. When braking is not needed, the control module cuts off the excitation current inside the retarder coil 8, so that no magnetic line is generated inside the retarder rotor 9. Consequently, no eddy current is generated on the inner wall of the retarder stator 5, and no braking moment is produced.

What is claimed is:

1. A liquid-cooled self-excited eddy current retarder, comprising:
a retarder rotor;
a retarder stator;
a retarder coil;
a retarder generator; and
a control module,
wherein:
the retarder rotor comprises a jagged turntable;
an axial cross section of the jagged turntable is in an inverted h shape;
the retarder rotor further comprises two salient poles each of which is located at a respective one of two axial ends of the jagged turntable;
an inner circle of the retarder stator is coaxial with an outer circle of the retarder rotor;
the retarder coil is an independent coil disposed between the two salient poles of the retarder rotor and is affixed to the retarder stator;
the retarder generator comprises a plurality of pairs of generator permanent magnetic poles, a generator armature core, and a generator armature winding;
the plurality of pairs of generator permanent magnetic poles are uniformly distributed on an inner wall of the retarder rotor and are respectively rotary parts;
the generator armature winding and the generator armature core are disposed on a retarder holder and are respectively fixed parts;
the generator armature winding and the retarder coil are respectively connected with a switch device through a rectifier module;
an output current of the generator armature winding is connected to the rectification module;
a controller receives a sinusoidal signal of one phase of a three-phase current of the retarder generator through the rectifier module to obtain a speed signal of the retarder;
an output of the rectifier module is connected to the retarder coil through the switch device to supply power to the retarder coil; and
an output of the controller is connected to a control terminal of the switch device to adjust an amount of a current flowing through the retarder coil.

2. A liquid-cooled self-excited eddy current retarder according to claim 1, wherein a clearance between the outer circle of each salient pole of the retarder rotor and the inner wall of the retarder stator is approximately 0.5 mm to 1.0 mm.

3. A liquid-cooled self-excited eddy current retarder according to claim 1, wherein the retarder stator comprises a coolant channel, the coolant channel configured to receive a coolant circulated with cooling water.

4. A liquid-cooled self-excited eddy current retarder according to claim 1, wherein the generator permanent magnetic poles comprise multiple pairs of permanent magnets which are uniformly distributed on the inner wall of the retarder rotor along a circumferential direction.

* * * * *